(12) United States Patent
Zhang et al.

(10) Patent No.: US 11,065,965 B2
(45) Date of Patent: Jul. 20, 2021

(54) METHOD AND SYSTEM FOR CONFIGURING REGENERATIVE BRAKING ENERGY RECOVERY DEVICES IN URBAN RAIL TRANSIT

(71) Applicant: CRRC QINGDAO SIFANG ROLLING STOCK RESEARCH INSTITUTE CO., LTD., Qingdao (CN)

(72) Inventors: Yawei Zhang, Qingdao (CN); Guohong Zhang, Qingdao (CN); Luzhou Liu, Qingdao (CN); Tong Wang, Qingdao (CN); Xiaohui Ren, Qingdao (CN); Yandong Zhang, Qingdao (CN); Kun Wang, Qingdao (CN); Pengfei Duan, Qingdao (CN); Xianding Yang, Qingdao (CN); Wei Liu, Qingdao (CN); Yang Yang, Qingdao (CN)

(73) Assignee: CRRC QINGDAO SIFANG ROLLING STOCK RESEARCH INSTITUTE CO., LTD. (CN), Qingdao (CN)

( * ) Notice: Subject to any disclaimer, the term of this patent is extended or adjusted under 35 U.S.C. 154(b) by 0 days.

(21) Appl. No.: 17/003,910

(22) Filed: Aug. 26, 2020

(65) Prior Publication Data

US 2020/0391596 A1 Dec. 17, 2020

Related U.S. Application Data

(63) Continuation of application No. PCT/CN2018/124317, filed on Dec. 27, 2018.

(30) Foreign Application Priority Data

Mar. 30, 2018 (CN) .......................... 201810290381.X

(51) Int. Cl.
*B60L 7/18* (2006.01)
*B60M 3/06* (2006.01)
(Continued)

(52) U.S. Cl.
CPC ................. *B60L 7/18* (2013.01); *B60M 3/06* (2013.01); *H02J 3/14* (2013.01); *H02J 3/144* (2020.01);
(Continued)

(58) Field of Classification Search
CPC .......... B60L 7/18; B60L 9/00; B60L 2200/26; H02J 3/46; H02J 3/14; H02J 3/144; B60M 3/06
(Continued)

(56) References Cited

U.S. PATENT DOCUMENTS 3,940,860 A * 3/1976 Unterreiner ............. F26B 21/02
34/535
2005/0000386 A1 * 1/2005 Inarida ...................... B61C 7/04
105/26.05
(Continued)

FOREIGN PATENT DOCUMENTS

CN 101353020 A 1/2009
CN 103419680 A 12/2013
(Continued)

OTHER PUBLICATIONS

D9: "Modeling and power supply calculation of inverter type regenerative energy feedback system", Modern Urban Transit, Nov. 2017, pp. 1-5.
(Continued)

*Primary Examiner* — Charles A Fox
*Assistant Examiner* — Michael E Butler
(74) *Attorney, Agent, or Firm* — J.C. Patents

(57) ABSTRACT

A method and system for configuring regenerative braking energy recovery devices in urban rail transit provided by the
(Continued)

present application, successively including the following steps: calculating a preliminarily configured capacity $P_n$ of a regenerative braking energy recovery device predetermined for the traction substation n, then obtaining an optimally configured capacity $Q_n$ of the regenerative braking energy recovery devices; further, configuring the total number of the regenerative braking energy recovery devices; finally, configuring the type of the regenerative braking energy recovery devices. By reasonably configure the capacity and number of regenerative braking energy recovery devices in traction substations, the configuring method of the present application allows the regenerative braking energy generated by a train during braking to be completely absorbed, thus reduce the energy consumption of braking resistors. Meanwhile, the waste of idle regenerative braking energy recovery devices is avoided, and the acquisition cost of devices is reduced. By reasonably configuring the type of regenerative braking energy recovery devices, the deficiencies of a single regenerative braking energy recovery device can be avoided.

8 Claims, 5 Drawing Sheets

(51) Int. Cl.
*H02J 3/14* (2006.01)
*H02J 3/46* (2006.01)
*B60L 9/00* (2019.01)

(52) U.S. Cl.
CPC . *H02J 3/46* (2013.01); *B60L 9/00* (2013.01); *B60L 2200/26* (2013.01)

(58) Field of Classification Search
USPC .......................................................... 701/19
See application file for complete search history.

(56) References Cited

U.S. PATENT DOCUMENTS

| | | | |
|---|---|---|---|
| 2005/0279242 A1* | 12/2005 | Maier | B60L 50/66 |
| | | | 105/26.05 |
| 2014/0368154 A1* | 12/2014 | Hanashima | H02J 3/32 |
| | | | 320/101 |
| 2015/0367736 A1* | 12/2015 | Salomonsen | B60L 50/60 |
| | | | 105/35 |
| 2016/0211738 A1* | 7/2016 | Bou-Saada | B60L 7/14 |
| 2018/0236899 A1* | 8/2018 | Takeoka | B60M 3/02 |

FOREIGN PATENT DOCUMENTS

| | | |
|---|---|---|
| CN | 103840477 A | 6/2014 |
| CN | 206031089 U | 3/2017 |
| CN | 107380187 A | 11/2017 |
| CN | 108437806 | 8/2018 |
| DE | 261485 A3 | 11/1988 |
| EP | 1493643 A1 | 1/2005 |

OTHER PUBLICATIONS

D10: "Optimal Configuration about Energy Feedback Device Used in Traction Power Supply System of Urban Rail Transit", Master's thesis, Beijing Jiaotong University, published on Jan. 31, 2017.
D11: "Hierarchical control and Capacity Allocation Optimization of Supercapacitor Energy Storage System for Urban Rail Transit", Doctoral dissertation, Beijing Jiaotong University, published on Nov. 15, 2017.
International Search Report.
CN Search Report.
First Office Action of the priority Chinese application.
Observation of the first Office Action of the priority Chinese application.
Extended European Search report for PCT/CN2018/124317.

* cited by examiner

METHOD AND SYSTEM FOR CONFIGURING REGENERATIVE BRAKING ENERGY RECOVERY DEVICES IN URBAN RAIL TRANSIT

CROSS-REFERENCE TO RELATED APPLICATION

This application is a continuation application of international Application No. PCT/CN2018/124317, filed on Dec. 27, 2018, which in turn claims the priority benefits of Chinese Patent Application No. 201810290381X, filed on Mar. 30, 2018. The contents of the above identified applications are incorporated herein by reference in their entirety.

TECHNICAL FIELD

The present application belongs to the field of regenerative braking energy recovery in urban rail transit, and in particular to a method and system for configuring regenerative braking energy recovery devices in urban rail transit.

BACKGROUND OF THE PRESENT INVENTION

Subway electricity consumption accounts for large part of the subway operation cost. Urban rail transit vehicles generally use "regenerative braking+ resistance braking+mechanical braking" means for braking. The kinetic energy of trains is converted into electric energy by regenerative braking, which is then fed back to the power supply grid. Part of the regenerative braking energy can be absorbed by adjacent vehicles on the line. If the regenerative energy cannot be absorbed by adjacent vehicles, the regenerative energy will be absorbed by resistors or the braking mode will be switched to air braking, the braking energy is wasted, and problems such as tunnel temperature rise and dust pollution will be brought. To improve the utilization of regenerative braking in trains, reduce the electricity consumption during operation, decrease the operating cost and reduce air pollution, the braking energy is generally recycled by configuring regenerative braking energy recovery devices in an urban rail transit system. At present, the main modes of regenerative energy recovery are divided into two types: energy-feedback type and energy-storage type.

The energy-feedback type regenerative energy recovery devices use an inverter to invert the excess regenerative braking energy in the DC power supply grid into AC power, and feedback to the Medium voltage AC grid by an energy feedback transformer to be used by other loads in the same Medium voltage grid, thereby achieve the goal of saving energy; in the energy-storage type regenerative energy recovery mode, an energy storage medium is connected to a DC-voltage grid in a substation by a switch device and a bidirectional DC/DC converter, to absorb the regenerative braking energy during train braking and release the regenerative braking energy during train traction, and in this mode, the absorption method using a super-capacitor as an energy storage medium is relatively mature.

The regenerative braking of subway trains brings great instability to the DC power supply system for the subway. Instead of the use of braking resistors, the conventional energy-storage type and energy-feedback type regenerative energy recovery devices absorb, by different methods, the supply-consumption unbalanced power (energy) resulted from regenerative braking, to maintain the stability of the DC power supply system. In the energy storage mode, the unbalanced energy is stored in the DC system; while, in the energy feedback mode, this part of energy is fed back to the looped medium voltage AC grid and then supplied to other loads through the looped grid. The two modes have their own advantages and disadvantages. The energy feedback devices have the advantages of high capacity, small space occupation and the like. However, after the use of energy feedback devices, the bidirectional flow of energy between the DC power supply system and the AC looped medium voltage AC grid is achieved, thereby increasing the flow complexity of energy in the system. Since the loads of the looped medium voltage AC grid still fluctuates, in practical applications, there is still a problem of returning power to a higher-voltage power system. Meanwhile, since there are multiple connections between the looped medium voltage AC grid and the DC power supply grid, there are circulating current problem when the energy feedback devices working. While, the energy storage mode has simple interfaces, does not have relationship with the AC power grid, and has an effect of restraining the drop of grid voltage. However, since the energy absorption is restricted by the capacity of the energy storage medium, the configuration of an enough high energy storage capacity will increase the size and cost of the devices and reduce the economic efficiency of the devices. Moreover, if the capacity of the regenerative energy recovery devices is configured to be too low, the regenerative energy cannot be effectively absorbed during the high-power braking of the train, so that the energy consumption of braking resistors is increased and it is disadvantageous for long-term energy saving; and, if the capacity of the regenerative energy recovery devices is configured to be too high, the acquisition cost of the devices is increased and the capacity of the devices is idle and wasted.

At present, the regenerative braking energy recovery devices are installed on more than 20 subway lines in China (mainly in Beijing, Chongqing, Zhengzhou, Changsha, Chengdu, etc.), but the regenerative braking energy recovery devices are installed in one or several traction substations on most of the lines, the purpose of installing the devices is purely to recycle as much energy as it can. The configuration of the devices is not calculated scientifically and reasonably. At present, there is no scientific and systematic calculation method for the configuration of regenerative braking energy recovery devices on the entire subway line.

In view of this, it is necessary to provide a system and method for configuring regenerative braking energy recovery devices in urban rail transit, which can realize the reasonable configuration of regenerative braking energy recovery devices in the urban rail transit.

SUMMARY OF THE PRESENT INVENTION

In view of the shortcomings of the prior art, the purpose of the present application is to provide a method and system for configuring regenerative braking energy recovery devices in urban rail transit.

In order to achieve the above purpose, the technical solution of the present application is: a method for configuring regenerative braking energy recovery devices in urban rail transit, successively comprising the following steps:

S1: First, performing train traction simulation and calculation, further performing train power supply simulation and calculation according to the result of the train traction simulation and calculation to obtain a regenerative braking power $S_n(t)$ of a traction substation n, and calculating a preliminarily configured capacity $P_n$ of a regenerative braking energy recovery device predetermined for the traction substation n according to the regenerative braking power $S_n(t)$ of the traction substation n, wherein $n \in \{1, 2, 3, \ldots N\}$, and N is the total number of traction substations.

S2: According to the preliminarily configured capacity $P_n$ of the regenerative braking energy recovery devices and in combination with the specification of the existing regenerative braking energy recovery devices, considering that when a regenerative braking energy recovery device is failed, adjacent regenerative braking energy recovery devices is capable to completely absorb the regenerative braking energy to be absorbed by the failed regenerative braking energy recovery device, performing capacity optimal configuration for the regenerative braking energy recovery devices to obtain an optimally configured capacity $Q_n$ of the regenerative braking energy recovery devices corresponding to the traction substation n.

S3: Performing configuration for the total number M of the regenerative braking energy recovery devices installed according to the optimally configured capacity $Q_n$ of the regenerative braking energy recovery devices.

S4: Further, performing configuration for the type of the regenerative braking energy recovery devices of the traction substation n according to the magnitude of the optimally configured capacity $Q_n$ and the total number M of the regenerative braking energy recovery devices installed as well as the locations of the regenerative braking energy recovery devices.

Preferably, the step S1 comprises the following steps:

S11: The train traction simulation and calculation: obtaining a traction energy consumption-velocity curve, a regenerative braking energy-velocity curve by a traction simulation algorithm of a traction simulation and calculation module through vehicle information parameters, dynamic performance parameters, resistance parameters, traction characteristic parameters and electric braking characteristic parameters;

S12: The train power supply simulation and calculation: obtaining the regenerative braking power $S_n(t)$ of the traction substation n by a power supply simulation and calculation module through a power supply simulation algorithm according to the traction energy consumption-velocity curve and the regenerative braking energy-velocity curve obtained by the traction simulation and calculation module and in combination with the impedance parameters of a power supply line, location parameters and capacity of the traction substation, number of departure;

S13: Preliminary configuration and calculation of the capacity of the regenerative braking energy recovery devices: performing preliminary configuration for the capacity of the regenerative braking energy recovery device of the traction substation n according to the obtained regenerative braking power $S_n(t)$ of the traction substation n.

Preferably, the step S13 comprises the following steps:

S131: Obtaining regenerative braking power $S_{nx}(t)$ corresponding to different departure intervals x according to the regenerative braking power $S_n(t)$ of the traction substation n calculated by the train power supply simulation and calculation, where $x \in \{1, 2, 3, \ldots X\}$, X denotes the number of departure intervals x, and the departure intervals x are related to a subway operation plan;

S132: According to the regenerative braking power $S_{nx}(t)$ under different departure intervals x, obtaining an aggregate of valid values $S_{Tnx}$ of the regenerative braking power within different continuous periods of time T under the corresponding departure interval x of the traction substation n, where T is related to the maximum running velocity of the train;

S133: Obtaining the valid value of the maximum regenerative braking power $P_{nx}$ within different continuous periods of time T under the corresponding departure interval x according to the aggregate of valid values $S_{Tnx}$;

S134: Obtaining the preliminarily configured capacity $P_n$ of the regenerative braking energy recovery device corresponding to the traction substation n, where $P_n = \text{Max } \{P_{n1}, P_{n2}, \ldots, P_{nx}, \ldots, P_{nX}\}$.

Preferably, the step S2 comprises the following steps:

S21: Converting an actually configured capacity $Z_n$ according to the preliminarily configured capacity $P_n$ of the regenerative braking energy recovery devices and the specification of the existing regenerative braking energy recovery devices;

S22: Determining when a regenerative braking energy recovery device is failed, whether adjacent regenerative braking energy recovery devices is capable to completely absorb the regenerative braking energy to be absorbed by the failed regenerative braking energy recovery device; if so, the actually configured capacity of the adjacent regenerative braking energy recovery devices is an optimally configured capacity; and, if not, increasing the capacity of the adjacent regenerative braking energy recovery devices by an integral time of the capacity unit value of the regenerative braking energy recovery devices, to obtain optimally configured capacity of the adjacent regenerative braking energy recovery devices.

Preferably, the step S22 comprises the following steps:

S221: According to the S13, obtaining the preliminarily configured capacity $P_n$, the departure interval x and the valid value of the maximum regenerative braking power $P_{nx}$ within different continuous periods of time T under the corresponding departure interval x of the failed regenerative braking energy recovery device, meanwhile, obtaining valid values of the maximum regenerative braking power of the adjacent regenerative braking energy recovery devices $P_{(n-1)x}$ and $P_{(n+1)x}$ within different continuous periods of time T under the corresponding departure interval x.

S222: Determining whether $Z_{n-1} + Z_{n+1} \geq P_{n-1} + P_n + P_{n+1}$ is true; if so, the actually configured capacity $Z_{n-1}$ and $Z_{n+1}$ of adjacent traction substations n−1 and n+1 remain unchanged; and, if not, perform S223;

S223: Determining the magnitude of the distances from the traction substation n respectively to the adjacent traction substation n−1 and to the adjacent traction substation n+1 $L_{n(n-1)}$ and $L_{n(n+1)}$; if $L_{n(1-1)} \geq L_{n(n+1)}$, increasing the actually configured capacity $Z_{n+1}$ of the traction substation n+1 by an integral time of the capacity unit value of the regenerative braking energy recovery devices to obtain an optimally configured capacity $Q_{n+1}$, and the optimally configured capacity $Q_{n-1}$ of the traction substation n−1 is the actually configured capacity $Z_{n-1}$; if $L_{n(n-1)} \leq L_{n(n+1)}$, increasing the actually configured capacity $Z_{n-1}$ of the traction substation n−1 by an integral time of the capacity unit value of the regenerative braking energy recovery devices to obtain an optimally configured capacity $Q_{n-1}$, and the optimally configured capacity $Q_{n+1}$ of the traction substation n+1 is the actually configured capacity $Z_{n+1}$.

Preferably, the step S22 comprises the following steps:

S221: According to the step S13, obtaining the preliminarily configured capacity $P_{n-1}$ and $P_{n+1}$ of the adjacent failed regenerative braking energy recovery devices, and according to the method in S21, converting the actually configured capacity $Z_{n-1}$ and $Z_{n+1}$ of the two;

S222: Determining whether $Z_{n-1} + Z_{n+1} \geq P_{(n-1)x} + P_{nx} + P_{(n+1)x}$ is true; if so, the actually configured capacity $Z_{n-1}$ and $Z_{n+1}$ of adjacent traction substations n−1 and n+1 remain unchanged; and, if not, perform S223;

S223: Determining the magnitude of the distances from the traction substation n respectively to the adjacent traction substation n−1 and to the adjacent traction substation n+1 $L_{n(n-1)}$ and $L_{n(n+1)}$; if $L_{n(n-1)} \geq L_{n(n+1)}$, increasing the actually configured capacity $Z_{n+1}$ of the traction substation n+1 by an integral time of the capacity unit value of the regenerative braking energy recovery devices to obtain an optimally configured capacity $Q_{n+1}$, and the optimally configured capacity $Q_{n-1}$ of the traction substation n−1 is the actually configured capacity $Z_{n-1}$; and, if $L_{n(n-1)} \leq L_{n(n+1)}$, increasing the actually configured capacity $Z_{n-1}$ of the traction substation n−1 by an integral time of the capacity unit value of the regenerative braking energy recovery devices to obtain an optimally configured capacity $Q_{n-1}$, and the optimally configured capacity $Q_{n+1}$ of the traction substation n+1 is the actually configured capacity $Z_{n+1}$.

Preferably, the step S3 comprises the following steps:

S31: Determining whether the optimally configured capacity $Q_n$ of the regenerative braking energy recovery device corresponding to the traction substation n is less than two times of the capacity unit value of the regenerative braking energy recovery devices; if so, removing the regenerative braking energy recovery device from the traction substation n; and, if not, installing the regenerative braking energy recovery device in the traction substation n according to the optimally configured capacity $Q_n$;

S32: Obtaining the actual total number M of the regenerative braking energy recovery devices installed and the actual total configured capacity $$\sum_{n=1}^{N} Q_n$$

of the regenerative braking energy recovery devices according to the result determined in the S31, wherein, an optimally configured capacity that is less than two times of the capacity unit value of the regenerative braking energy recovery devices is not included in $Q_n$.

Preferably, the step S3 comprises the following steps:

S31: Determining whether the optimally configured capacity $Q_n$ of the regenerative braking energy recovery device corresponding to the traction substation n is less than the capacity unit value of the regenerative braking energy recovery devices; if so, removing the regenerative braking energy recovery device from the traction substation n; and, if not, installing the regenerative braking energy recovery device in the traction substation n according to the optimally configured capacity $Q_n$;

S32: Obtaining the actual total number M of the regenerative braking energy recovery devices installed and the actual total configured capacity $$\sum_{n=1}^{N} Q_n$$

of the regenerative braking energy recovery devices according to the result determined in the S31, wherein, an optimally configured capacity that is less than the capacity unit value of the regenerative braking energy recovery devices is not included in $Q_n$.

Preferably, the step S4 comprises the following steps:

S41: Calculating an average capacity $$E = \sum_{n=1}^{N} Q_n / M$$

of the regenerative braking energy recovery devices according to the result of calculation in the S32.

S42: Determining whether the traction substation n is adjacent to a main substation; if so, configuring the regenerative braking energy recovery device corresponding to the traction substation n as an energy storage unit; and, if not, performing S43;

S43: Determining whether the optimally configured capacity $Q_n$ of the regenerative braking energy recovery device corresponding to the traction substation n is less than the average capacity E; if so, configuring the regenerative braking energy recovery device of the traction substation n as an energy storage unit; and, if not, configuring regenerative braking energy recovery device of the traction substation n as an energy feedback unit.

Preferably, the vehicle information parameters comprise vehicle type, marshaling and load; the dynamic performance parameters comprise the acceleration and deceleration of the vehicle; the resistance parameters comprise starting resistance and basic resistance; the traction characteristic parameters comprise traction force; and, the electric braking characteristic parameters comprise electric braking force.

Preferably, in S22, increasing the capacity of the adjacent regenerative braking energy recovery devices by one time of the capacity unit value.

A system for configuring regenerative braking energy recovery devices in urban rail transit, the system uses the configuration method described above:

The system comprises a preliminary configurating unit, a capacity optimally configuring unit, a total number configurating unit and a type configurating unit;

the preliminary configurating unit is configured to perform train traction simulation and calculation, further to perform train power supply simulation and calculation according to the result of train traction simulation and calculation to obtain a regenerative braking power $S_n(t)$ of a traction substation n, and calculate a preliminarily configured capacity $P_n$ of regenerative braking energy recovery device predetermined for the traction substation n according to the regenerative braking power $S_n(t)$ of the traction substation n, where n∈{1, 2, 3, . . . X} and N is the total number of traction substations; the capacity optimally configuring unit is configured to perform capacity optimal configuration for the regenerative braking energy recovery devices to obtain an optimally configured capacity $Q_n$ of the regenerative braking energy recovery devices corresponding to the traction substation n, according to the preliminarily configured capacity $P_n$ of regenerative braking energy recovery devices and in combination with the specification of the existing regenerative braking energy recovery devices and by considering that when a regenerative braking energy recovery device is failed, adjacent regenerative braking energy recovery devices are capable to completely absorb the regenerative braking energy to be absorbed by the failed regenerative braking energy recovery device;

the total number configurating unit is configured to perform configuration for the total number M of the regenerative braking energy recovery devices installed according to the optimally configured capacity $Q_n$ of the regenerative braking energy recovery devices;

the type configurating unit is configured to further perform configuration for the type of the regenerative braking energy recovery devices of the traction substation n, according to the optimally configured capacity $Q_n$ and the total number M of the regenerative braking energy recovery devices installed as well as the locations of the regenerative braking energy recovery devices.

Compared with the prior art, the present application has the following advantages and positive effects.

1. In the method for configuring regenerative braking energy recovery devices in urban rail transit provided by the present application, by reasonably configuring the capacity and number of regenerative braking energy recovery devices in traction substations, the regenerative braking energy generated by a train during braking can be completely absorbed, and the energy consumption of braking resistors is greatly reduced. Accordingly, the better energy saving effect is achieved, the waste of idle regenerative braking energy recovery devices is avoided, and the acquisition cost of devices is reduced. By reasonably configuring the type of regenerative braking energy recovery devices, the deficiencies of a single regenerative braking energy recovery device can be avoided.

2. In the method for configuring regenerative braking energy recovery devices in urban rail transit provided by the present application, by performing calculating and analyzing the traction and power supply of the train, and in combination with the train line conditions, driving planning and other factors, regenerative braking energy recovery devices are reasonably configured on the entire line. Moreover, by fully considering the capacity absorption of adjacent regenerative braking energy recovery devices and the influence from the failure of a certain device, the capacity of the regenerative braking energy recovery devices is further optimized. Accordingly, a capacity configuration and optimization system for regenerative energy recovery devices on all lines in the entire urban rail transit is established, and the better regenerative braking energy recovery effect is achieved.

DETAILED DESCRIPTION OF THE PRESENT INVENTION

In the following, the present application will be described in detail through exemplary implementations. However, it should be understood, without further recitation, the elements, structure and features in one implementation may be beneficially combined in other implementations without further recitation.

Figure 1:
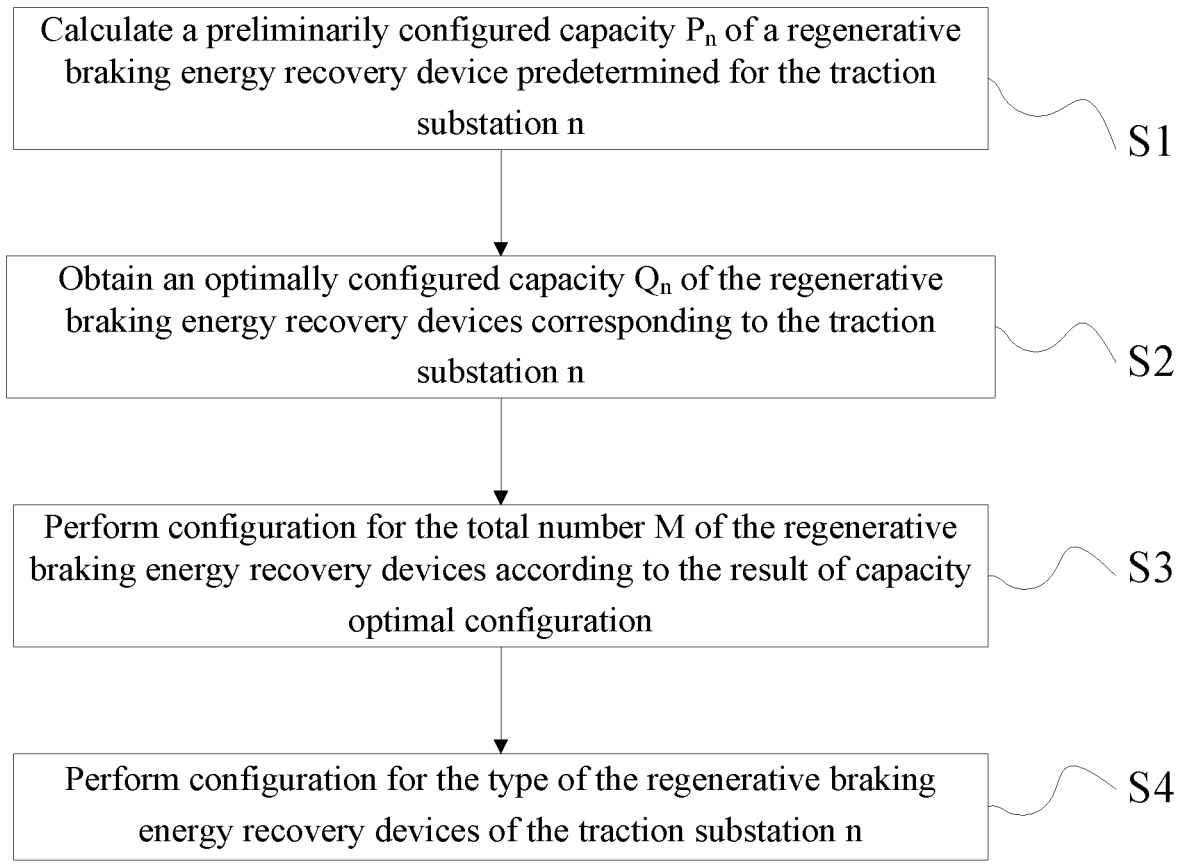
FIG. 1 is a flow chart of configuring regenerative braking energy recovery devices in urban rail transit according to one embodiment of the present application.

As shown in FIG. 1, the present application provides a method for configuring regenerative braking energy recovery devices in urban rail transit, successively comprising the following steps:

S1: First, train traction simulation and calculation is performed, train power supply simulation and calculation is further performed according to the result of the train traction simulation and calculation to obtain a regenerative braking power $S_n(t)$ of a traction substation n, and a preliminarily configured capacity $P_n$ of a regenerative braking energy recovery device predetermined for the traction substation n is calculated according to the regenerative braking power $S_n(t)$ of the traction substation n, wherein $n \in \{1, 2, 3, \ldots N\}$, and N is the total number of traction substations.

S2: According to the preliminarily configured capacity $P_n$ of the regenerative braking energy recovery devices and in combination with the specification of the existing regenerative braking energy recovery devices, considering that when a regenerative braking energy recovery device is failed, adjacent regenerative braking energy recovery devices is capable to completely absorb the regenerative braking energy to be absorbed by the failed regenerative braking energy recovery device, the capacity optimal configuration for the regenerative braking energy recovery devices is performed to obtain an optimally configured capacity $Q_n$ of the regenerative braking energy recovery devices corresponding to the traction substation n.

S3: Configuration for the total number M of the regenerative braking energy recovery devices installed is performed according to the optimally configured capacity $Q_n$ of the regenerative braking energy recovery devices.

S4: According to the optimally configured capacity $Q_n$ and the total number M of the regenerative braking energy recovery devices installed as well as the locations of the regenerative braking energy recovery devices, configuration for the type of the regenerative braking energy recovery devices of the traction substation n is further performed.

Wherein, preferably, one regenerative braking energy recovery device is installed in each of the traction substations. In the method for configuring regenerative braking energy recovery devices in urban rail transit provided by the present application, by reasonably configuring the capacity and number of the regenerative braking energy recovery devices in the traction substations, so that the regenerative braking energy generated by a train during braking can be completely absorbed, and the energy consumption of braking resistors is greatly reduced. Accordingly, the better energy saving effect is achieved, the waste of idle regenerative braking energy recovery devices is avoided, and the acquisition cost of devices is reduced. By reasonably configuring the type of the regenerative braking energy recovery devices, the deficiencies of the single regenerative braking energy recovery device can be avoided.

Figure 2:
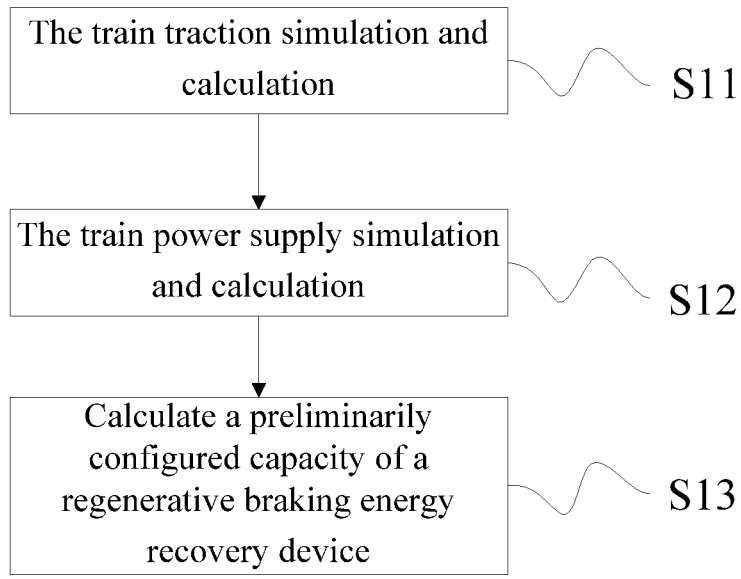
FIG. 2 is a flow chart of preliminarily configuring capacity of regenerative braking energy recovery devices in urban rail transit according to one embodiment of the present application.

As shown in FIG. 2, the step S comprises the following steps.

S11: The train traction simulation and calculation: characteristic curves comprising a traction energy consumption-velocity curve, a regenerative braking energy-velocity curve, a velocity-running time curve and a regenerative braking energy-velocity curve are obtained by a traction simulation algorithm of a traction simulation and calculation module through vehicle information parameters, dynamic performance parameters, resistance parameters, traction characteristic parameters and electric braking characteristic parameters, wherein the vehicle information parameters comprise vehicle type, marshaling and load; the dynamic performance parameters comprise the acceleration and deceleration of the vehicle; the resistance parameters comprise starting resistance and basic resistance; the traction characteristic parameters comprise traction force; and, the electric braking characteristic parameters comprise electric braking force.

The traction simulation and calculation can be performed by means of the existing urban rail transit traction calculation software or the developed special software to output the curves, and will not be detailed here.

S12: The train power supply simulation and calculation: by a power supply simulation algorithm of a power supply simulation and calculation module, the regenerative braking power $S_n(t)$ of the traction substation n is obtained preferably according to the traction energy consumption-velocity curve and the regenerative braking energy-velocity curve calculated by the traction simulation and calculation module and in combination with the impedance parameters of a power supply line, location parameters and capacity of the traction substation, number of departure, etc.

The power supply simulation and calculation above can be performed by means of the existing urban rail transit power supply calculation software or the jointly developed special software, and will not be detailed here.

The existing urban rail transit power supply simulation and analysis software includes EMM from the Carnegie-Mellon university, SINANET and OPEN TRACK & POWER NET from the ELBAS Company, RAILPOWER from the Balfour Beatty Company, urban rail transit power supply simulation software URTPS, etc.

S13: Preliminary configuration and calculation of the capacity of the regenerative braking energy recovery devices: preliminary configuration for the capacity of the regenerative braking energy recovery device of the traction substation n is performed according to the obtained regenerative braking power $S_n(t)$ of the traction substation n.

Figure 3:
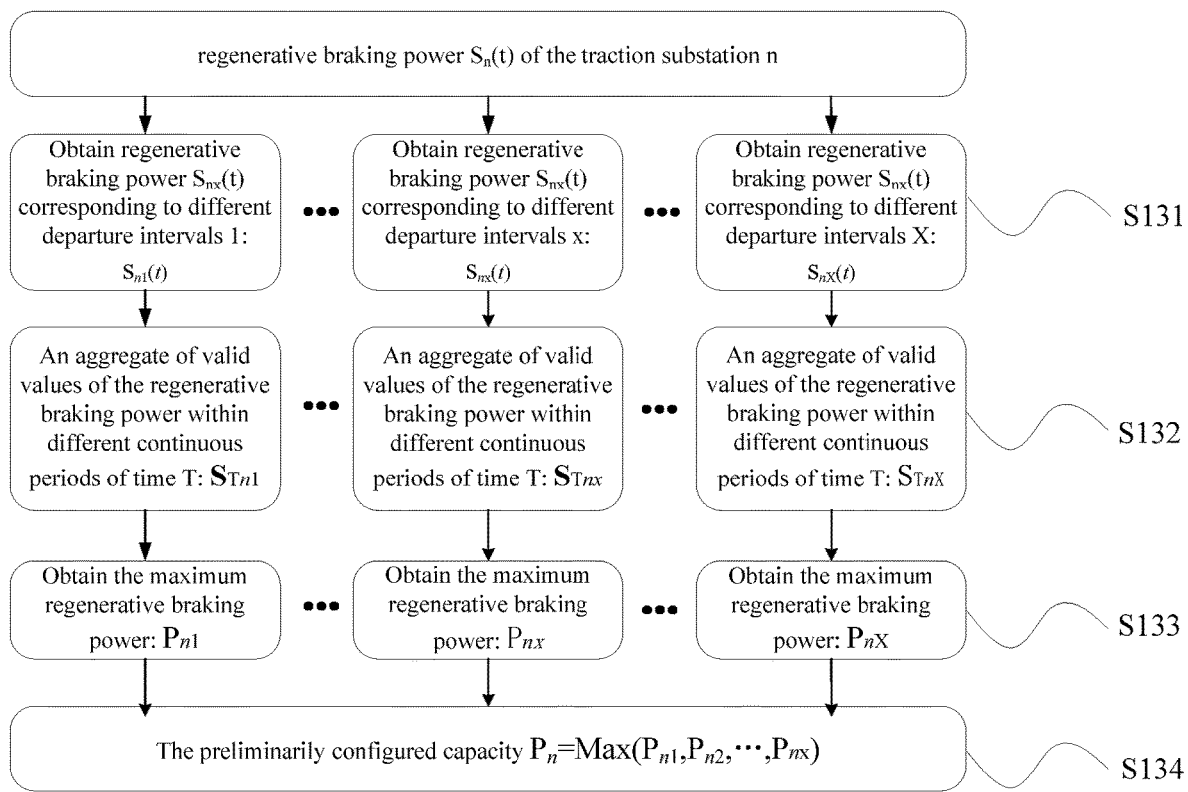
FIG. 3 is a flow chart of S13 in FIG. 2.

As shown in FIG. 3, the step S13 comprises the following steps.

S131: Regenerative braking power $S_{nx}(t)$ corresponding to different departure intervals x is obtained according to the regenerative braking power $S_n(t)$ of each traction substation calculated by the train power supply simulation and calculation, where $x \in \{1, 2, 3, \ldots X\}$, X denotes the number of departure intervals x, and the departure intervals x are related to a subway operation plan.

It is to be noted that the "departure interval" refers to the time interval between departure of the last train and the next train, in seconds or minutes. The smaller the value of the departure interval is, the higher the departure frequency is. The departure intervals of domestic urban rail transit trains vary from two minutes to more than ten minutes. When the value of x in the "departure interval x" is different, that is, "departure interval 1", "departure interval 2" . . . "departure interval X" refer to different departure intervals (which can also be interpreted as "the first departure interval", "the second departure interval" . . . "the Xth departure interval"), different departure interval x have different departure interval values.

In this step, every time one departure interval x is set, one train power supply simulation and calculation is performed to obtain the corresponding regenerative braking power $S_{nx}(t)$ under a different departure interval x.

S132: According to the regenerative braking power $S_{nx}(t)$ under different departure intervals x, an aggregate of valid values $S_{Tnx}$ of the regenerative braking power within different continuous periods of time T under corresponding departure interval x of the traction substation n is obtained, where T is related to the maximum running velocity of the train;

wherein, under the departure interval x, the valid value of the regenerative braking power of the traction substation n within different continuous periods of time T is:

$$s_{nx} = \sqrt{\frac{1}{T}\int_a^{a+T} s_{nx}(t)^2 dt},$$

in which, T is related to the maximum running velocity of the train and is generally 15 s to 35 s. Thus, the aggregate of valid values $S_{Tnx}$ of the regenerative braking power of the traction substation n within different continuous periods of time T under the corresponding departure interval x is obtained. Here, the continuous period of time T may be interpreted as the feedback time of the regenerative braking energy. If the maximum running velocity of the train is higher, under the same braking force, a longer time is required for braking, and the feedback time of the regenerative braking energy is longer. The continuous period of time T is positively related to the braking time of the train and also related to the maximum running velocity of the train.

S133: The valid value of the maximum regenerative braking power $P_{nx}$ within different continuous periods of time T under the corresponding departure interval x is obtained according to the aggregate of valid values $S_{Tnx}$.

S134: The preliminarily configured capacity $P_n$ of the regenerative braking energy recovery device corresponding to the traction substation n is obtained, where $P_n = \text{Max}\{P_{n1}, P_{n2}, \ldots, P_{nx}, \ldots, P_{nX}\}$.

During the preliminary configuring of the capacity of the regenerative energy recovery devices, the influence from the departure interval x is taken into consideration, and the difference in the departure interval x directly influences the distribution of the generative braking energy on the entire line; and, the valid value of the regenerative braking power $S_{nx}$ within a continuous period of time T is taken into consideration, and T is selected according to actual maximum velocity of the train and directly influences the amount of the regenerative braking energy during the braking process of a single train. By considering the departure interval x and the continuous period of time T, the practicability and scientific nature of the capacity configuration of the regenerative energy recovery devices are ensured.

Figure 4:
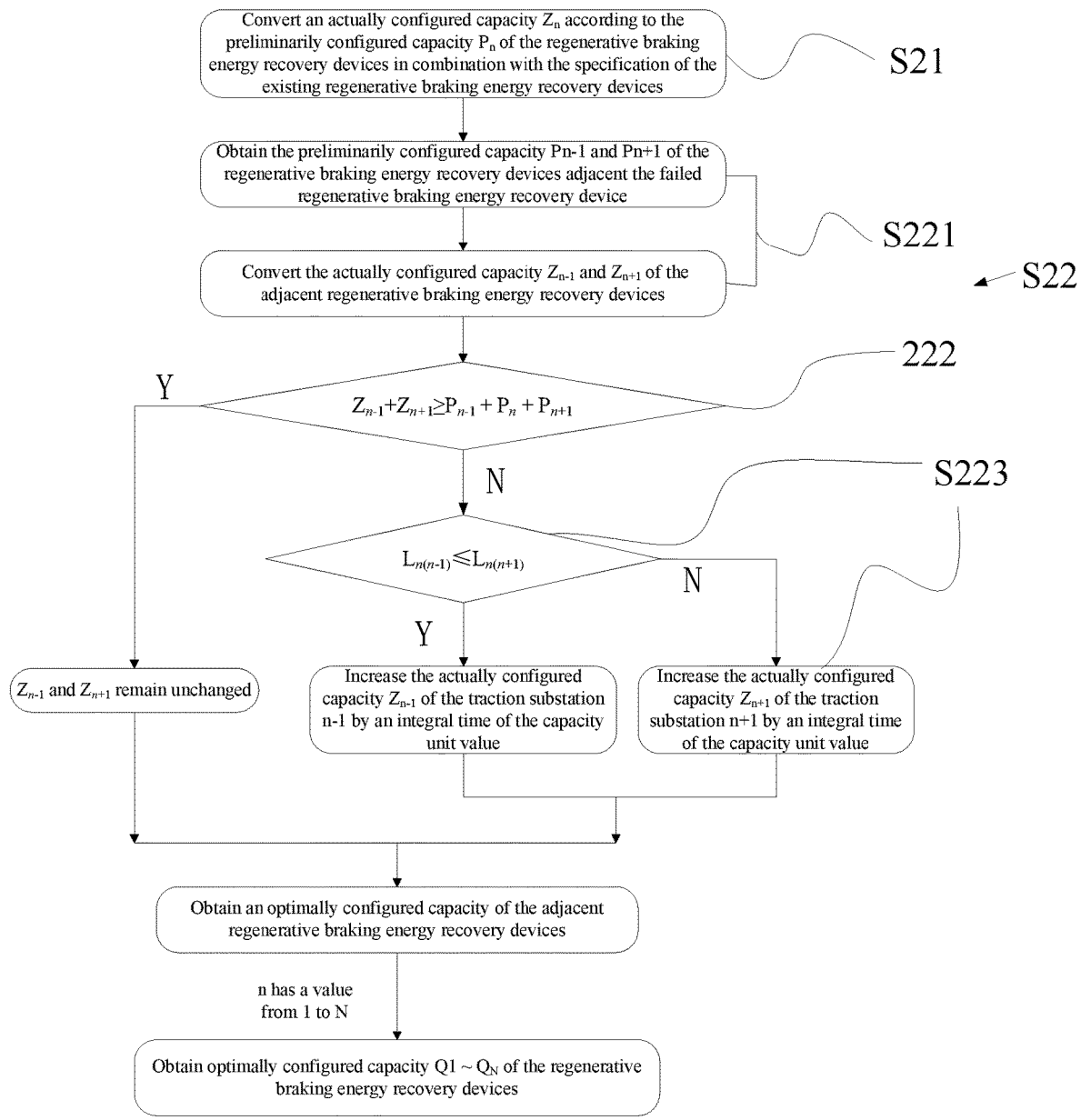
FIG. 4 is a flow chart of optimally configuring the capacity of the regenerative braking energy recovery devices in urban rail transit according to one embodiment of the present application.

As shown in FIG. 4, the step S2 comprises the following steps.

S21: An actually configured capacity $Z_n$ is converted according to the preliminarily configured capacity $P_n$ of the regenerative braking energy recovery devices and the specification of the existing regenerative braking energy recovery devices.

Based on the actual manufacturing and industrial standards, the capacity unit value of the existing regenerative braking energy recovery devices is generally 500 kW, and the capacity of a single regenerative braking energy recovery device is generally 0.5 MW, 1 MW, 1.5 MW, 2 MW, 2.5 MW, 3 MW, 3.5 MW and 4 MW. The capacity conversion principle follows the principle of rounding to nearest. For example, if the preliminarily configured capacity is 2.665 MW, the capacity is converted to 2.5 MW; and, if the preliminarily configured capacity is 2.825 MW, the capacity is converted to 3 MW.

S22: When a regenerative braking energy recovery device is failed, whether adjacent regenerative braking energy recovery devices is capable to completely absorb the regenerative braking energy to be absorbed by the failed regenerative braking energy recovery device is determined; if so, the actually configured capacity of the adjacent regenerative braking energy recovery devices is an optimally configured capacity; and, if not, the capacity of the adjacent regenerative braking energy recovery devices is increased by an integral time of the capacity unit value of the regenerative braking energy recovery devices, to obtain optimally configured capacity of the adjacent regenerative braking energy recovery devices. By using the optimally configured capacity of the adjacent regenerative braking energy recovery devices, the regenerative braking energy to be absorbed by the failed regenerative braking energy recovery device can be completely absorbed.

With continued reference to FIG. 4, the step S22 comprises the following steps.

S221: According to the S13, the preliminarily configured capacity $P_n$, the departure interval x and the valid value of the maximum regenerative braking power $P_{nx}$ within different continuous periods of time T under the corresponding departure interval x of the failed regenerative braking energy recovery device is obtained, meanwhile, valid values of the maximum regenerative braking power of the adjacent regenerative braking energy recovery devices $P_{(n-1)x}$ and $P_{(n+1)x}$ within different continuous periods of time T under the corresponding departure interval x are obtained.

S222: Whether $Z_{n-1}+Z_{n+1} \geq P_{(n-1)x}+P_{nx}+P_{(n+1)x}$ is true is determined; if so, the actually configured capacity $Z_{n-1}$ and $Z_{n+1}$ of adjacent traction substations n−1 and n+1 remain unchanged; and, if not, perform S223;

S223: The magnitude of the distances from the traction substation n respectively to the adjacent traction substation n−1 and to the adjacent traction substation n+1 $L_{n(n-1)}$ and $L_{n(n+1)}$ is determined; if $L_{n(n-1)} \geq L_{n(n+1)}$, the actually configured capacity $Z_{1+1}$ of the traction substation n+1 is increased by an integral time of the capacity unit value of the regenerative braking energy recovery devices to obtain an optimally configured capacity $Q_{n+1}$, and the optimally configured capacity $Q_{n-1}$ of the traction substation n−1 is the actually configured capacity $Z_{n-1}$; and, if $L_{n(n-1)} \leq L_{n(n+1)}$, the actually configured capacity $Z_{n-1}$ of the traction substation n−1 is increased by an integral time of the capacity unit value of the regenerative braking energy recovery devices to obtain an optimally configured capacity $Q_{n-1}$, and the optimally configured capacity $Q_{n+1}$ of the traction substation n+1 is the actually configured capacity $Z_{n+1}$. By using the optimally configured capacity $Q_{n+1}$ or $Q_{n-1}$ that is increased by an integral time of the capacity unit value, the regenerative braking energy to be absorbed by the failed regenerative braking energy recovery device can be completely absorbed.

Preferably, the capacity of the adjacent regenerative braking energy recovery devices is increased by 0.5 MW to finely adjust the converted capacity. If the capacity is too high, the capacity of the devices will be idle and wasted.

To describe the step S22 more clearly, the step S221 to S223 are expressed in another way, specifically:

S221: According to the preliminarily configured capacity $P_{n-1}$ and $P_{n+1}$ of the adjacent regenerative braking energy recovery devices of the failed regenerative braking energy recovery device obtained in the step S13, the actually configured capacity $Z_{n-1}$ and $Z_{n+1}$ of the two are converted according to the method in S21;

S222: Whether $Z_{n-1}+Z_{n+1} \geq P_{n-1}+P_n+P_{n+1}$ is true is determined; if so, the actually configured capacity $Z_{n-1}$ and $Z_{1+1}$ of adjacent traction substations n−1 and n+1 remains unchanged; and, if not, perform S223;

S223: The magnitude of the distances from the traction substation n respectively to the adjacent traction substation n−1 and to the adjacent traction substation n+1 $L_{n(n-1)}$ and $L_{n(n+1)}$ is determined; if $L_{n(n-1)} \geq L_{n(n+1)}$, the actually configured capacity $Z_{n+1}$ of the traction substation n+1 is increased by an integral time of the capacity unit value of the regenerative braking energy recovery devices to obtain an optimally configured capacity $Q_{n+1}$, and the optimally configured capacity $Q_{n-1}$ of the traction substation n−1 is the actually configured capacity $Z_{n-1}$; and, if $L_{n(n-1)} \leq L_{n(n+1)}$, the actually configured capacity $Z_{n-1}$ of the traction substation n−1 is increased by an integral time of the capacity unit value of the regenerative braking energy recovery devices to obtain an optimally configured capacity $Q_{n-1}$, and the optimally configured capacity $Q_{n+1}$ of the traction substation n+1 is the actually configured capacity $Z_{n+1}$. By using the optimally configured capacity $Q_{n+1}$ or $Q_{n-1}$ that is increased by an integral time of the capacity unit value, the regenerative braking energy to be absorbed by the failed regenerative braking energy recovery device can be completely absorbed.

Through the above steps S221 to S223, the n of the traction substation has a value from 1 to N, and the optimally configured capacity $Q_1$ to $Q_N$ of the regenerative braking energy recovery devices in the traction substations can be calculated.

Preferably, the capacity of the adjacent regenerative braking energy recovery devices is increased by 0.5 MW to finely adjust the converted capacity. If the capacity is too high, the capacity of the device will be idle and wasted.

During the optimally configuring of the capacity of the regenerative energy recovery devices, considering the sudden failure of the regenerative braking energy recovery device during the actual operation, the capability of adjacent regenerative braking energy recovery devices to share the power of the failed regenerative braking energy recovery device is calculated, the adjacent regenerative braking energy recovery devices with insufficient sharing capability are appropriately increased in capacity. In the adjacent regenerative braking energy recovery devices, the regenerative braking energy recovery device closest to the failed regenerative braking energy recovery device is selected and increased in capacity, so that the highest capability to share the power of the failed device is ensured. Meanwhile, the capacity is increased by 0.5 MW, so that the actual engineering experience and cost are fully taken into consideration and the better regenerative braking energy recovery effect is achieved.

Figure 5:
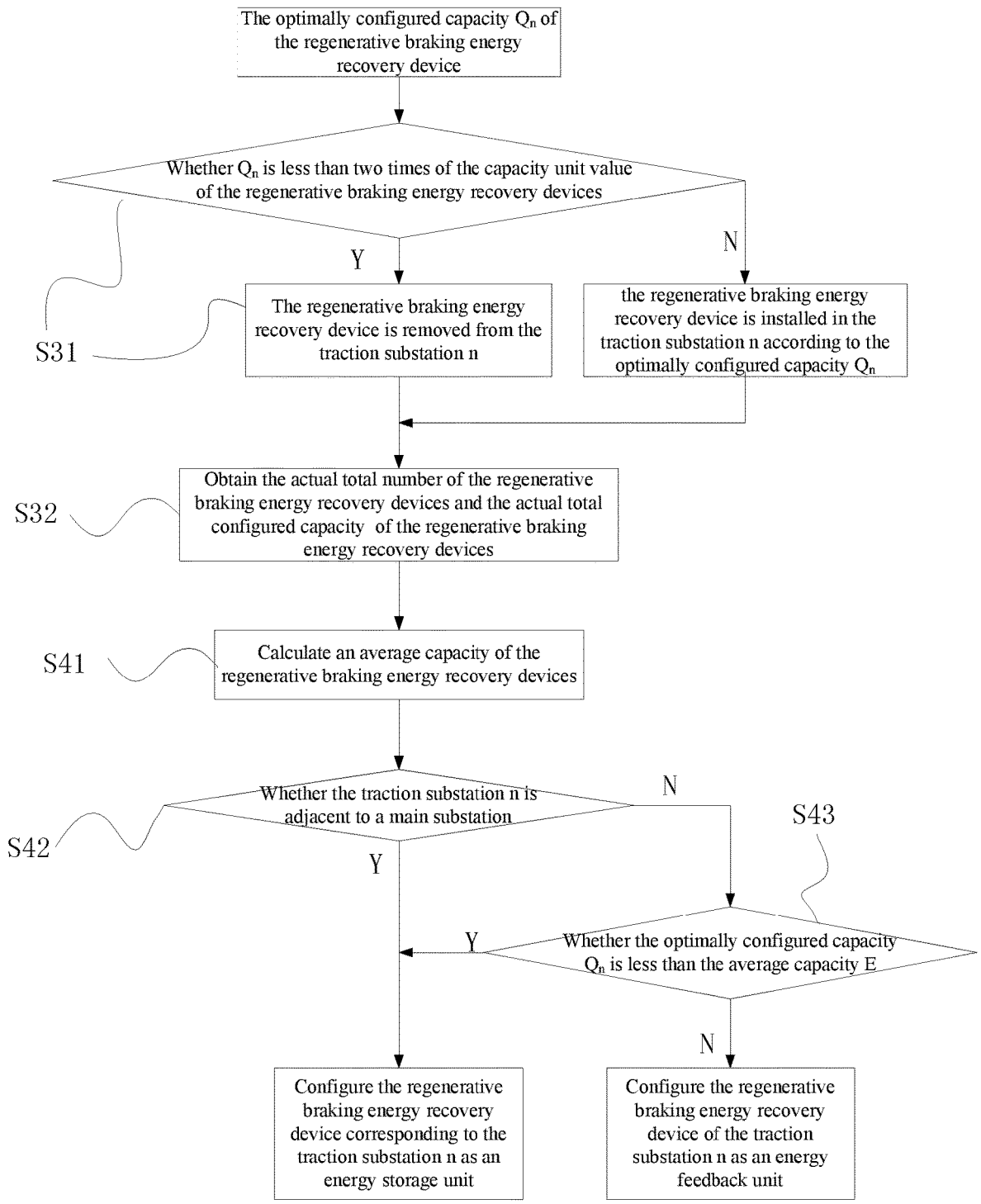
FIG. 5 is a flow chart of configuring the number and the type of the regenerative braking energy recovery devices in urban rail transit according to one embodiment of the present application.

As shown in FIG. 5, the step S3 comprises the following steps.

S31: Whether the optimally configured capacity Q of the regenerative braking energy recovery device corresponding to the traction substation n is less than two times of the capacity unit value of the regenerative braking energy recovery devices (i.e., preferably 1 MW) is determined; if so, the regenerative braking energy recovery device is removed from the traction substation n; and, if not, the regenerative braking energy recovery device is installed in the traction substation n according to the optimally configured capacity $Q_n$.

The step S31 may be adjusted as required. For example, to further improve the recovered regenerative braking energy, whether the optimally configured capacity $Q_n$ of the regenerative braking energy recovery device corresponding to the traction substation n is less than the capacity unit value of the regenerative braking energy recovery devices (i.e., 0.5

MW) is determined; if so, the regenerative braking energy recovery device is removed from the traction substation n; and, if not, the regenerative braking energy recovery device is installed in the traction substation n according to the optimally configured capacity $Q_n$.

S32: The actual total number M of the regenerative braking energy recovery devices installed and the actual total configured capacity $$\sum_{n=1}^{N} Q_n$$

of the regenerative braking energy recovery devices are obtained according to the result determined in the S31, wherein, according to the S31, an optimally configured capacity that is less than two times of the capacity unit value of the regenerative braking energy recovery devices or an optimally configured capacity that is one time of the capacity unit value of the regenerative braking energy recovery devices is not included in $Q_n$.

With reference to FIG. 5, the step S4 comprises the following steps.

S41: An average capacity $$E = \sum_{n=1}^{N} Q_n / M$$

of the regenerative braking energy recovery devices is calculated according to the result of calculation in the S32.

S42: Whether the traction substation n is adjacent to a main substation is determined; if so, the regenerative braking energy recovery device corresponding to the traction substation n is configured as an energy storage unit; and, if not, perform S43.

S43: Whether the optimally configured capacity $Q_n$ of the regenerative braking energy recovery device corresponding to the traction substation n is less than the average capacity E is determined; if so, the regenerative braking energy recovery device of the traction substation n is configured as an energy storage unit; and, if not, the regenerative braking energy recovery device of the traction substation n is configured as an energy feedback unit.

By reasonably configuring the type of regenerative braking energy recovery devices, the deficiency of a single regenerative braking energy recovery device can be avoided.

Figure 6:
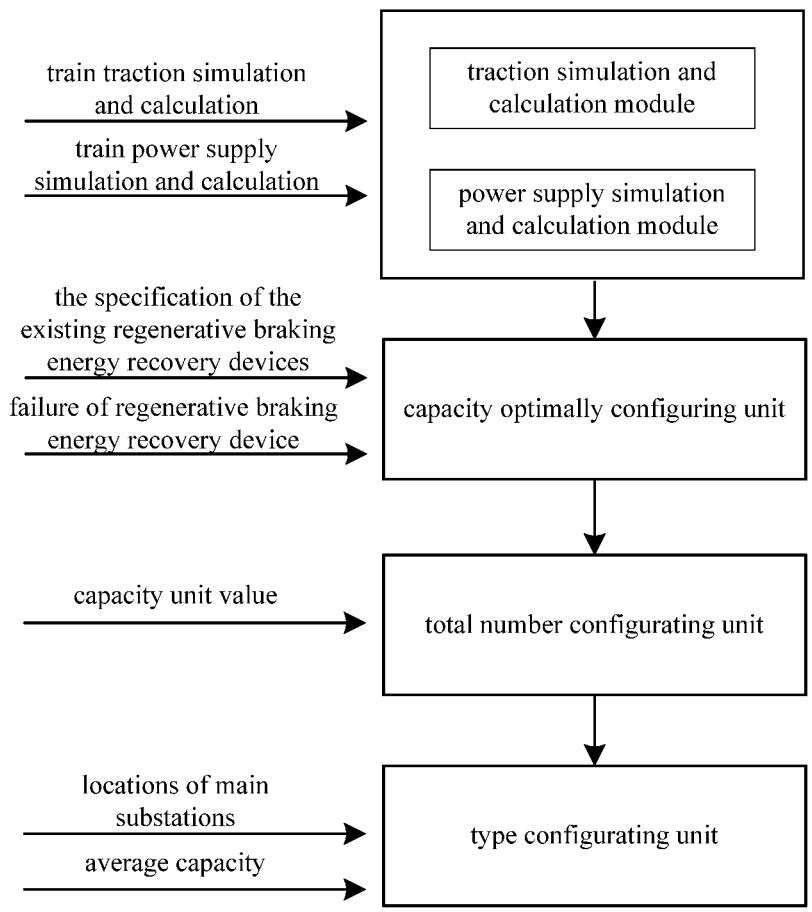
FIG. 6 is a schematic diagram of the system for the regenerative braking energy recovery devices in urban rail transit according to one embodiment of the present application.

With reference to FIG. 6, an embodiment of the present application provides a system for configuring regenerative braking energy recovery devices in urban rail transit. The system uses the configuration method described above.

The system comprises a preliminary configurating unit, a capacity optimally configuring unit, a total number configurating unit and a type configurating unit; the preliminary configurating unit comprises a traction simulation and calculation module configured to perform traction simulation and calculation, and a train power supply simulation and calculation module configured to perform train power supply simulation and calculation;

the preliminary configurating unit is configured to perform train traction simulation and calculation, further to perform train power supply simulation and calculation according to the result of the train traction simulation and calculation to obtain a regenerative braking power $S_n(t)$ of a traction substation n, and calculate a preliminarily configured capacity $P_n$ of regenerative braking energy recovery device predetermined for the traction substation n according to the regenerative braking power $S_n(t)$ of the traction substation n, where $n \in \{1, 2, 3, \ldots X\}$ and N is the total number of traction substations; the capacity optimally configuring unit is configured to perform capacity optimal configuration for the regenerative braking energy recovery devices to obtain an optimally configured capacity $Q_n$ of the regenerative braking energy recovery devices corresponding to the traction substation n, according to the preliminarily configured capacity $P_n$ of regenerative braking energy recovery devices and in combination with the specification of the existing regenerative braking energy recovery devices and by considering that when a regenerative braking energy recovery device is failed, adjacent regenerative braking energy recovery devices are capable to completely absorb the regenerative braking energy to be absorbed by the failed regenerative braking energy recovery device;

the total number configurating unit is configured to perform configuration for the total number M of the regenerative braking energy recovery devices installed according to the optimally configured capacity $Q_n$ of the regenerative braking energy recovery devices;

the type configurating unit is configured to further perform configuration for the type of the regenerative braking energy recovery devices of the traction substation n, according to the optimally configured capacity $Q_n$ and the total number M of the regenerative braking energy recovery devices installed as well as the locations of the regenerative braking energy recovery devices.

The invention claimed is:

1. A method for configuring regenerative braking energy recovery devices in urban rail transit, successively comprising the following steps:
    S1: first, performing train traction simulation and calculation, further performing train power supply simulation and calculation according to the result of the train traction simulation and calculation to obtain a regenerative braking power $S_n(t)$ of a traction substation n, and calculating a preliminarily configured capacity $P_n$ of a regenerative braking energy recovery device predetermined for the traction substation n according to the regenerative braking power $S_n(t)$ of the traction substation n, wherein $n \in \{1, 2, 3, \ldots N\}$, and N is the total number of traction substations;
    wherein the step S1 comprises the following steps:
    S11: the train traction simulation and calculation: obtaining a traction energy consumption-velocity curve, a regenerative braking energy-velocity curve by a traction simulation algorithm of a traction simulation and calculation module through vehicle information parameters, dynamic performance parameters, resistance parameters, traction characteristic parameters and electric braking characteristic parameters;
    S12: the train power supply simulation and calculation: obtaining the regenerative braking power $S_n(t)$ of the traction substation n by a power supply simulation algorithm of a power supply simulation and calculation module according to the traction energy consumption-velocity curve and the regenerative braking energy-velocity curve obtained by the traction simulation and calculation module and in combination with the impedance parameters of a power supply line, location parameters and capacity of the traction substation, number of departure;

S13: preliminary configuration and calculation of the capacity of the regenerative braking energy recovery devices: performing preliminary configuration for the capacity of the regenerative braking energy recovery device of the traction substation n according to the obtained regenerative braking power $S_n(t)$ of the traction substation n;

S2: according to the preliminarily configured capacity $P_n$ of the regenerative braking energy recovery devices and in combination with the specification of the existing regenerative braking energy recovery devices, considering that when a regenerative braking energy recovery device is failed, adjacent regenerative braking energy recovery devices is capable to completely absorb the regenerative braking energy to be absorbed by the failed regenerative braking energy recovery device, performing capacity optimal configuration for the regenerative braking energy recovery devices to obtain an optimally configured capacity $Q_n$, of the regenerative braking energy recovery devices corresponding to the traction substation n;

wherein the step S2 comprises the following steps:

S21: converting an actually configured capacity $Z_n$ according to the preliminarily configured capacity $P_n$ of the regenerative braking energy recovery devices and the specification of the existing regenerative braking energy recovery devices;

S22: determining when a regenerative braking energy recovery device is failed, whether adjacent regenerative braking energy recovery devices is capable to completely absorb the regenerative braking energy to be absorbed by the failed regenerative braking energy recovery device, if so, the actually configured capacity of the adjacent regenerative braking energy recovery devices is an optimally configured capacity, and, if not, increasing the capacity of the adjacent regenerative braking energy recovery devices by an integral time of the capacity unit value of the regenerative braking energy recovery devices, to obtain optimally configured capacity of the adjacent regenerative braking energy recovery devices;

S3: performing configuration for the total number M of the regenerative braking energy recovery devices installed according to the optimally configured capacity $Q_n$, of the regenerative braking energy recovery devices;

wherein the step S3 comprises the following steps:

S31: determining whether the optimally configured capacity $Q_n$ of the regenerative braking energy recovery device corresponding to the traction substation n is less than two times of the capacity unit value of the regenerative braking energy recovery devices, if so, removing the regenerative braking energy recovery device from the traction substation n, and, if not, installing the regenerative braking energy recovery device in the traction substation n according to the optimally configured capacity $Q_n$;

S32: obtaining the actual total number M of the regenerative braking energy recovery devices installed and the actual total configured capacity $$\sum_{n=1}^{N} Q_n$$

of the regenerative braking energy according to the result determined in the S31, wherein, an optimally configured capacity that is less than two times of the capacity unit value of the regenerative braking energy recovery devices is not included in $Q_n$;

S4: according to the magnitude of the optimally configured capacity $Q_n$, and the total number M of the regenerative braking energy recovery devices installed as well as the locations of the regenerative braking energy recovery devices, further performing configuration for the type of the regenerative braking energy recovery devices of the traction substation n;

wherein the step S4 comprises the following steps:

S41: calculating an average capacity $$E = \sum_{n=1}^{N} Q_n / M$$

of the regenerative braking energy recovery devices according to the result of calculation in the S32;

S42: determining whether the traction substation n is adjacent to a main substation, if so, configuring the regenerative braking energy recovery device corresponding to the traction substation n as an energy storage unit, and, if not, performing S43;

S43: determining whether the optimally configured capacity $Q_n$ of the regenerative braking energy recovery device corresponding to the traction substation n is less than the average capacity E, if so, configuring the regenerative braking energy recovery device of the traction substation n as an energy storage unit, and, if not, configuring regenerative braking energy recovery device of the traction substation n as an energy feedback unit.

2. The method for configuring regenerative braking energy recovery devices in urban rail transit according to claim 1, wherein the step S13 comprises the following steps:

S131: obtaining regenerative braking power $S_{nx}(t)$ corresponding to different departure intervals x according to the regenerative braking power $S_n(t)$ of the traction substation n calculated by the train power supply simulation and calculation, where $x \in \{1, 2, 3, \ldots X\}$, X denotes the number of departure intervals x, and the departure intervals x are related to a subway operation plan;

S132: according to the regenerative braking power $S_{nx}(t)$ under different departure intervals x, obtaining an aggregate of valid values $S_{Tnx}$ of the regenerative braking power within different continuous periods of time T under the corresponding departure interval x of the traction substation n, where T is related to the running velocity of the train;

S133: obtaining the valid value of the maximum regenerative braking power $P_{nx}$ within different continuous periods of time T under the corresponding departure interval x according to the aggregate of valid values $S_{Tnx}$;

S134: obtaining the preliminarily configured capacity $P_n$, of the regenerative braking energy recovery device corresponding to the traction substation n, where $P_n = \text{Max } \{P_{n1}, P_{n2}, P_{nx}, P_{nx}\}$.

3. The method for configuring regenerative braking energy recovery devices in urban rail transit according to claim 1, wherein the step S22 comprises the following steps:

S221: according to the S13, obtaining the preliminarily configured capacity $P_n$, the departure interval x and the valid value of the maximum regenerative braking power $P_{nx}$ within different continuous periods of time T under the corresponding departure interval x of the failed regenerative braking energy recovery device, meanwhile, obtaining valid values of the maximum regenerative braking power of the adjacent regenerative braking energy recovery devices $P_{(n-1)x}$ and $P_{(n+1)x}$ within different continuous periods of time T under the corresponding departure interval x;

S222: determining whether $Z_{n-1}+Z_{n+1} \geq P_{(n-1)x}+P_{nx}+P_{(n+1)x}$ is true, if so, the actually configured capacity $Z_{n-1}$ and $Z_{n-1}$ of adjacent traction substations n−1 and n+1 remain unchanged, and, if not, perform S223;

S223: determining the magnitude of the distances from the traction substation n respectively to the adjacent traction substation n−1 and to the adjacent traction substation n+1 $L_{n(n-1)}$ and $L_{n(n+1)}$; if $L_{n(n-1)} \leq L_{n(n+1)}$, increasing the actually configured capacity $Z_{n+1}$ of the traction substation n+1 by an integral time of the capacity unit value of the regenerative braking energy recovery devices to obtain an optimally configured capacity $Q_{n+1}$, and the optimally configured capacity $Q_{n-1}$ of the traction substation n−1 is the actually configured capacity $Z_{n-1}$; if $L_{n(n-1)} \geq L_{n(n+1)}$, increasing the actually configured capacity $Z_{n-1}$ of the traction substation n−1 by an integral time of the capacity unit value of the regenerative braking energy recovery devices to obtain an optimally configured capacity $Q_{n-1}$, and the optimally configured capacity $Q_{n+1}$ of the traction substation n+1 is the actually configured capacity $Z_{n+1}$.

4. The method for configuring regenerative braking energy recovery devices in urban rail transit according to claim 1, wherein the step S22 comprises the following steps:

S221: according to the step S13, obtaining the preliminarily configured capacity $P_{n-1}$ and $P_{n+1}$ of the adjacent failed regenerative braking energy recovery devices, and according to the method in S21, converting the actually configured capacity $Z_{n-1}$ and $Z_{n+1}$ of the two;

S222: determining whether $Z_{n-1}+Z_{n+1} \geq P_{n-1}+P_n+P_{n+1}$ is true, if so, the actually configured capacity $Z_{n-1}$ and $Z_{n+1}$ of adjacent traction substations n−1 and n+1 remain unchanged, and, if not, perform S223;

S223: determining the magnitude of the distances from the traction substation n respectively to the adjacent traction substation n−1 and to the adjacent traction substation n+1 $L_{n(n-1)}$ and $L_{n(n+1)}$; if $L_{n(n-1)} \geq L_{n(n+1)}$, increasing the actually configured capacity $Z_{n+1}$ of the traction substation n+1 by an integral time of the capacity unit value of the regenerative braking energy recovery devices to obtain an optimally configured capacity $Q_{n+1}$, and the optimally configured capacity $Q_{n-1}$ of the traction substation n−1 is the actually configured capacity $Z_{n-1}$; and, if $L_{n(n-1)} \leq L_{n(n+1)}$, increasing the actually configured capacity $Z_{n-1}$ of the traction substation n−1 by an integral time of the capacity unit value of the regenerative braking energy recovery devices to obtain an optimally configured capacity $Q_{n-1}$, and the optimally configured capacity Qn+1 of the traction substation n+1 is the actually configured capacity $Z_{n+1}$.

5. The method for configuring regenerative braking energy recovery devices in urban rail transit according to claim 1, wherein the step S3 comprises the following steps:

S31: determining whether the optimally configured capacity $Q_n$ of the regenerative braking energy recovery device corresponding to the traction substation n is less than the capacity unit value of the regenerative braking energy recovery devices, if so, removing the regenerative braking energy recovery device from the traction substation n, and, if not, installing the regenerative braking energy recovery device in the traction substation n according to the optimally configured capacity $Q_n$;

S32: obtaining the actual total number M of the regenerative braking energy recovery $$\sum_{n=1}^{N} Q_n$$

devices installed and the actual total configured capacity of the regenerative braking energy recovery devices according to the result determined in the S31, wherein, an optimally configured capacity that is less than the capacity unit value of the regenerative braking energy recovery devices is not included in $Q_n$.

6. The method for configuring regenerative braking energy recovery devices in urban rail transit according to claim 1, wherein, the vehicle information parameters comprise vehicle type, marshaling and load; the dynamic performance parameters comprise the acceleration and deceleration of the vehicle; the resistance parameters comprise starting resistance and basic resistance; the traction characteristic parameters comprise traction force; and, the electric braking characteristic parameters comprise electric braking force.

7. The method for configuring regenerative braking energy recovery devices in urban rail transit according to claim 1, wherein, in S22, increasing the capacity of the adjacent regenerative braking energy recovery devices by one time of the capacity unit value.

8. A system for configuring regenerative braking energy recovery devices in urban rail transit, wherein, the system comprises a preliminary configurating unit, a capacity optimally configurating unit, a total number configurating unit and a type configurating unit;

the preliminary configurating unit is configured to perform train traction simulation and calculation, further to perform train power supply simulation and calculation according to the result of train traction simulation and calculation to obtain a regenerative braking power $S_n(t)$ of a traction substation n, and calculate a preliminarily configured capacity $P_n$ of regenerative braking energy recovery device predetermined for the traction substation n according to the regenerative braking power $S_n(t)$ of the traction substation n, where n ∈ {1, 2, 3, . . . X} and N is the total number of traction substations; the capacity optimally configuring unit is configured to perform capacity optimal configuration for the regenerative braking energy recovery devices to obtain an optimally configured capacity $Q_n$ of the regenerative braking energy recovery devices corresponding to the traction substation n, according to the preliminarily configured capacity $P_n$ of regenerative braking energy recovery devices and in combination with the specification of the existing regenerative braking energy recovery devices and by considering that when a regenerative braking energy recovery device is failed, adjacent regenerative braking energy recovery devices are capable to completely absorb the regenerative braking energy to be absorbed by the failed regenerative braking energy recovery device;

the total number configurating unit is configured to perform configuration for the total number M of the regenerative braking energy recovery devices installed according to the optimally configured capacity $Q_n$, of the regenerative braking energy recovery devices;

the type configurating unit is configured to further perform configuration for the type of the regenerative braking energy recovery devices of the traction substation n, according to the optimally configured capacity $Q_n$, and the total number M of the regenerative braking energy recovery devices installed as well as the locations of the regenerative braking energy recovery devices.

* * * * *